April 15, 1941.    S. P. VAUGHN ET AL    2,238,837
TEMPERATURE-REGULATING DEVICE
Filed May 9, 1940    2 Sheets-Sheet 1
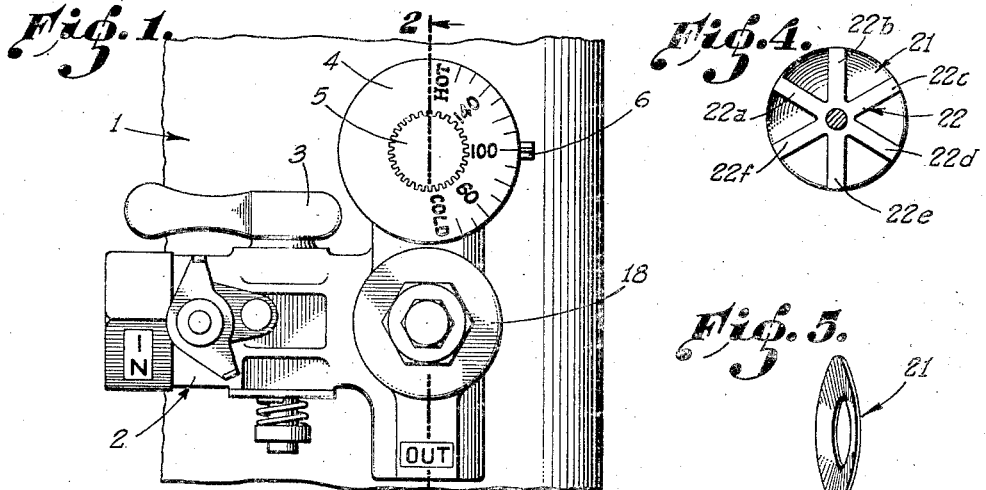
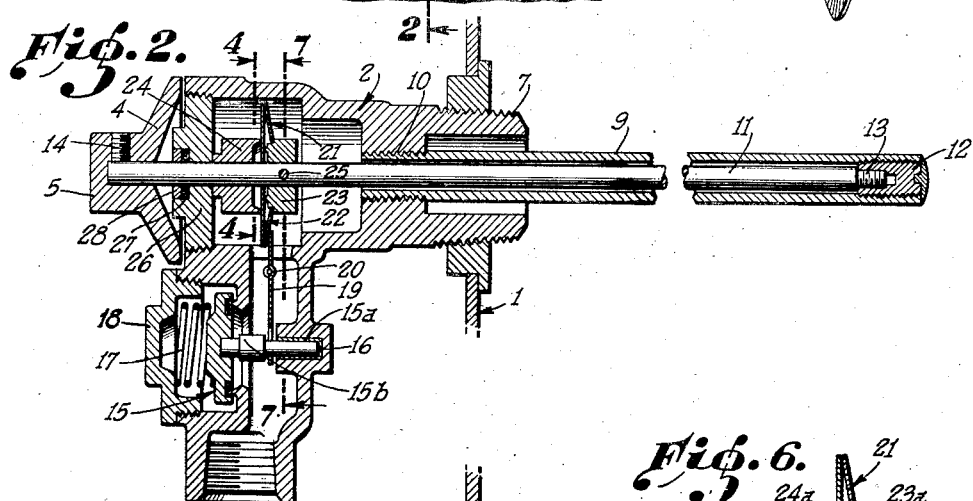
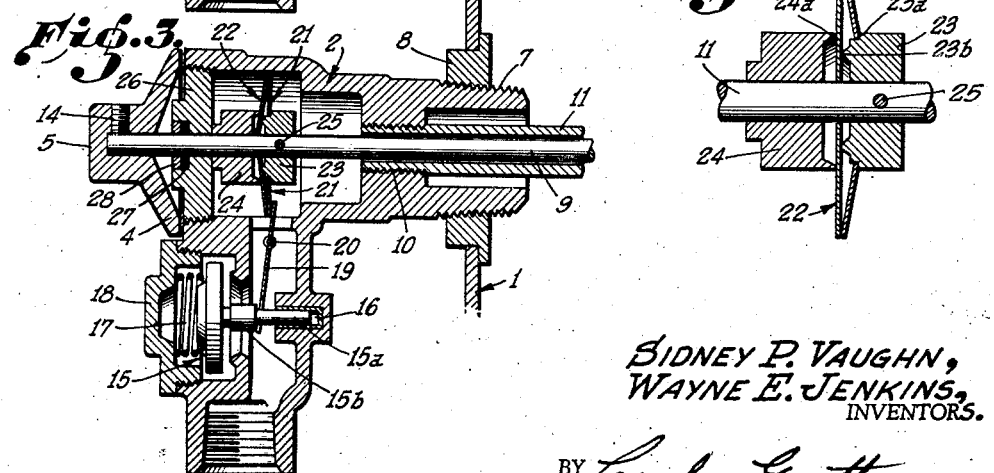
SIDNEY P. VAUGHN,
WAYNE E. JENKINS,
INVENTORS.
BY Crosby Gauthier
ATTORNEY.

April 15, 1941.    S. P. VAUGHN ET AL    2,238,837
TEMPERATURE-REGULATING DEVICE
Filed May 9, 1940    2 Sheets-Sheet 2
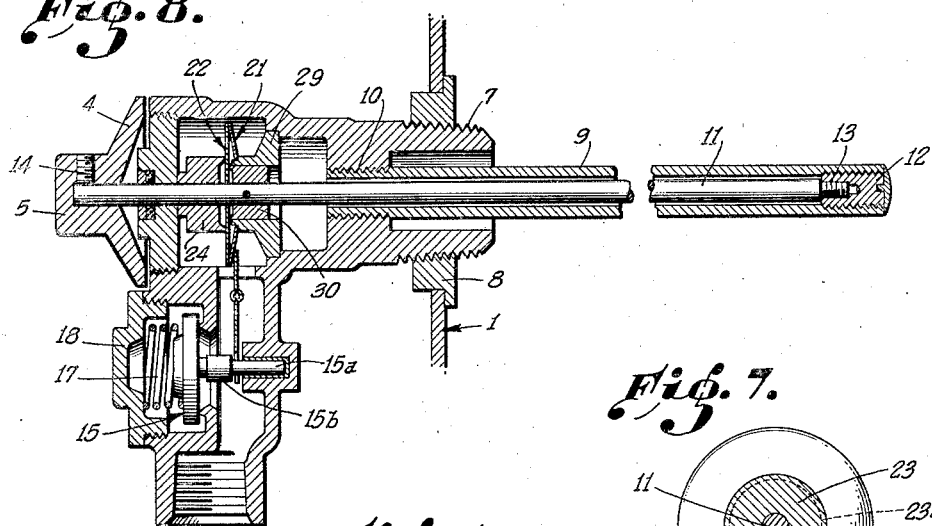
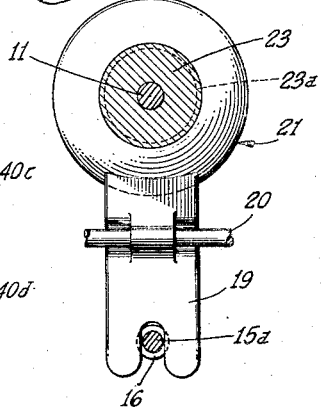
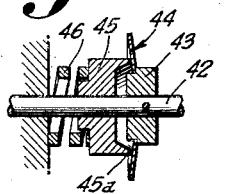
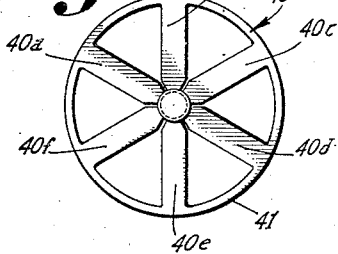
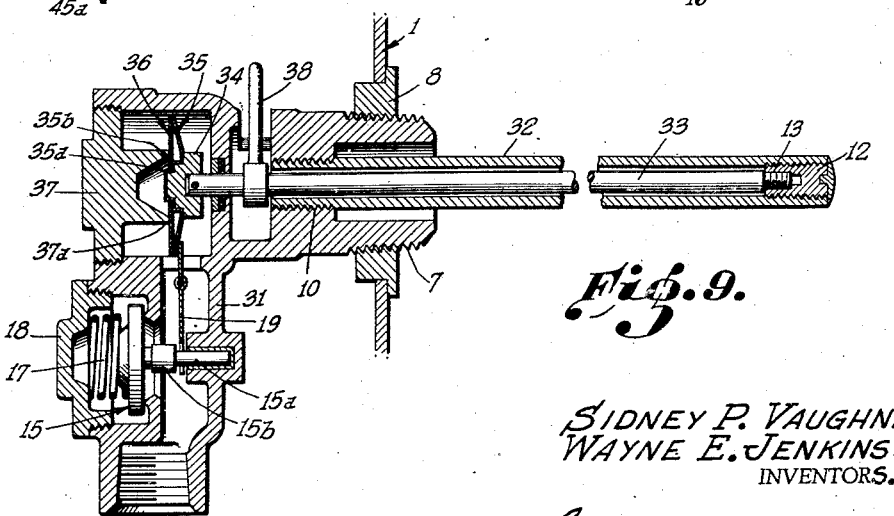
SIDNEY P. VAUGHN,
WAYNE E. JENKINS,
INVENTORS.
BY Crosby Gauthier
ATTORNEY.

Patented Apr. 15, 1941

2,238,837

UNITED STATES PATENT OFFICE 2,238,837

TEMPERATURE-REGULATING DEVICE

Sidney P. Vaughn, Long Beach, and Wayne E. Jenkins, Los Angeles, Calif., assignors to Domestic Manufacturing Company, Inc., Los Angeles, Calif., a corporation of California Application May 9, 1940, Serial No. 334,192

15 Claims. (Cl. 236—48)

This invention relates to thermostats and has to do more especially with water heater thermostats of the type wherein a fuel-control valve or electrical contact is automatically and abruptly opened and closed in response to temperature changes so as to maintain the hot water supply at a substantially constant temperature—that is to say, within a relatively narrow range.

Thermostatic devices in accordance with the present invention are of the snap-action disc variety wherein the valve or electrical contact is opened abruptly and, generally, also closed abruptly—being thus, in all instances, distinguished from thermostatic devices of the gradual operating type.

Our invention also pertains more specifically to water heater thermostats of the type comprising a temperature-responsive element of the rod and tube variety—which element projects into the water heater tank and consists of a tube of thermally expansible metal, such as copper, and a co-axial rod of material such as Invar steel having an extremely low temperature co-efficient of expansion. Temperature-responsive elements of the rod and tube type are highly satisfactory for use in domestic water heaters because they are dependable and relatively inexpensive to manufacture; but unlike some other types of elements which are not equally satisfactory in the above respects, the rod and tube type element is characterized in that it affords but an extremely small movement of the rod in response to the ordinarily allowable range of temperature variation. More explicitly, in a thermostat of the rod and tube type designed for use on domestic water heaters of common proportions and adjusted to limit the temperature variation to a range in the neighborhood of 15 to 20 degrees, the longitudinal movement of the rod is of the order of .002". Such a small movement is insufficient in practice to actuate a snap-action disc unless in one way or another amplifying means are interposed between the temperature-responsive element and the snap-action disc or within the disc itself. The necessary amplification can be obtained as in Spencer U. S. Letters Patent No. 1,678,407 by applying the actuating forces to opposite faces of the disc along circumferential lines closely spaced radially whereby the disc itself is caused to function as a movement amplifying leverage system; or the amplification can be achieved by introducing a lever between the temperature-responsive element and the snap-action disc, as shown in Merrick U. S. Letters Patent No. 1,542,712. The arrangement of the aforementioned Spencer patent and, likewise, that of Grayson U. S. Letters Patent No. 1,699,468—which is simply another form of the Spencer arrangement—is of the utmost mechanical simplicity but not entirely satisfactory for water heater service because if so designed and constructed as to operate within a narrow temperature range the disc will be inordinately strained whenever the thermostat may be subjected to very low temperatures; and it may thus be permanently injured or rendered inoperative.

In the device of the Merrick patent danger of injury to the disc when subjected to low temperatures is obviated by the provision of a resilient cup through which the actuating force is applied to the disc and which will yield to excessive forces—thus functioning to safeguard the disc against those forces. The Merrick thermostat, though functionally correct and reliable in operation, is somewhat costly to manufacture and, therefore, handicapped commercially in the highly competitive domestic water heater market.

One of the principal objects of our present invention is to provide a water heater thermostat which is completely reliable in operation without being susceptible to injury when subjected to low temperatures and which can be manufactured at a cost which enables it to meet competition in the low price field.

Another important object is to provide a water heater thermostat wherein the temperature regulating knob or similar element is located at the front of the device where it is completely visible and accessible, so that the housewife cannot only operate it with ease but will know it is there and not be left in doubt as to its purpose and mode of operation.

Still another object is to provide a thermostatic valve of the abrupt action type in which a satisfactorily large valve lift is obtained, thus providing an unconstricted passageway for gas through the valve.

A major feature of our invention resides in the combination with a free edge snap-action disc or annulus, of a plurality of resilient levers distributed around and extending radially from the axial center of the disc or annulus and serving as means for amplifying the small longitudinal movement of the rod of the temperature-responsive element and applying actuating force to the disc or annulus at or near the peripheral edge thereof—the aforesaid levers being preferably punched from a sheet of spring material such as stainless spring steel—there being preferably an interconnecting web between adjacent levers, which web is integral with the levers and serves to locate and hold them in their proper relative positions. The assemblage of interconnected resilient levers here referred to forms what will be denominated a "spider," and said "spider" is situated immediately adjacent the normally concave side of the disc or annulus and held in concentric relation with the disc or annulus—being gripped between a pair of fulcrum elements which serve to apply opposing forces to the levers so as to cause the outer ends of the levers to bear against the normally concave face of the disc or annulus with force sufficient to snap the same in response to a predetermined temperature condition. The levers forming the "spider" are quite flexible, but have enough rigidity, in the aggregate, to transmit adequate force to snap the disc; but the resiliency of the levers is such as to restrict the force within the limits of safety in event of the device being subjected to inordinately low temperatures—thus obviating possible injury to the disc or annulus, which might otherwise be expected to occur in extreme cold weather if the device happened to be so situated as to be unprotected therefrom.

It is essential to the operation of any self-restoring over center snap-action disc or annulus that the medium through which the actuating force is applied thereto be resilient to such an extent that it will yield during the initial application of force and be able instantly to recuperate and follow through, so to speak, when the disc or annulus passes dead center. The ordinary rod and tube thermo-responsive element such as we employ has not the requisite yieldability to enable the Invar rod to follow through where the actuating forces are applied to the disc or annulus at its axial center and outer edge, respectively, or inner and outer peripheral edges, respectively, as the case may be. Hence, it is necessary to introduce the requisite yieldability at some convenient point between the expansible tube and the disc or annulus. We do this most conveniently, compactly and economically in the preferred structures of the present invention by making the "spider" of elastic sheet material. By so doing we achieve several important objectives at a single stroke, namely: (1) yieldability for the avoidance of excessive strains imposed upon the disc or annulus and other parts in event of the device being subjected to extraordinarily low temperatures; (2) essential resiliency in the system for transmitting actuating force to the disc or annulus whereby to bring about a snap action instead of a gradual over center movement of the disc or annulus; (3) a very high degree of compactness—which incidentally reduces the size of the body casting and the cost thereof; and (4) low manufacturing cost due to the cheapness of the "spider" punching and to simplification of assembling operations. In addition, the "spider" performs its primary function, which is to amplify the movements of the Invar rod.

With the exception of the body casting, the component parts of our thermostatic valve are mostly simple and inexpensive screw machine and punch press products entailing a minimum of production labor; and the arrangement is such as to greatly simplify the assembling and adjusting operations.

This application is a continuation-in-part of our co-pending application, Serial No. 241,410, filed November 19, 1938.

In the drawings which accompany this specification there are illustrated several embodiments of our invention.

Referring to the drawings:

Fig. 1 is a front elevational view of a thermostatic valve in accordance with what we consider the preferred construction;

Fig. 2 is a vertical section taken along the line 2—2 of Fig. 1, showing the internal mechanism—the fuel control valve being closed;

Fig. 3 is identical with Fig. 2 except that a portion of the temperature-responsive element has been broken off and the fuel control valve shown open—the snap-action mechanism and associated parts being shown in their open-valve positions;

Fig. 4 is a face view of the "spider" taken along the line 4—4 of Fig. 2—showing also the frustro-conical snap-action annulus situated to the rear of the "spider;"

Fig. 5 is a perspective view of a frustro-conical snap-action annulus;

Fig. 6 is an enlarged detail, in section, comprising the annular snap-action disc, the "spider" and the two fulcrum elements, together with a portion of the Invar rod;

Fig. 7 is an enlarged view taken along the line 7—7 of Fig. 2, illustrating particularly the lever interconnecting the snap-action annulus with the stem of the fuel control valve;

Fig. 8 is a sectional view of a thermostatic valve of modified design;

Fig. 9 is a sectional view illustrating still another modification;

Fig. 10 is a plan view of a "spider" of modified form; and

Fig. 11 is a sectional view illustrating an alternative construction within the purview of our invention.

Modern domestic water heaters are most commonly of the gas-fired storage type; although electrical heating is now being used also to a very considerable extent. A thermostatic control designed for use on a gas-fired automatic water heater of the storage type inevitably comprises a valve which is automatically opened and closed to control the flow of gas to the main burner—the valve being opened automatically when the water temperature has dropped to some predetermined value, and, in turn, closed automatically when the temperature has thereafter risen to some higher predetermined value. Where the heating medium is electricity a switch is substituted in place of the automatic gas control valve. A closed switch allows current to flow to an electrical heating element and an open valve allows gas to flow to a burner. Hence, a closed switch is analogous to a closed valve. Manifestly, each can always be substituted for the other in any thermostatic device.

We are primarily interested in thermostatic valves for use on gas-fired water heaters and for that reason we have illustrated in the accompanying drawings only devices of that specific character.

In the front elevation, Fig. 1, the water heater tank, shown fragmentarily, is identified by reference numeral 1. The thermostatic valve comprises a body casting 2 in which is incorporated a shut-off cock 3. The body casting serves as a support and enclosure for the automatic fuel control valve and the mechanism for actuating the same. The dial 4 on the front of the device is manually rotatable, being provided with a knob 5, which is an integral part thereof; and the dial is graduated and appropriately marked as shown. A stationary index 6, attached to the body casting, registers with the dial graduations and serves to indicate the temperature of the water for which the device is adjusted. By rotating the knob and dial the householder can raise and lower the average temperature of the water in the tank to suit his momentary personal desires. The gas inlet and outlet connections are shown in Fig. 1 and marked accordingly. Other parts shown in Fig. 1 but unrelated to the present invention and not essential thereto will not be described. Provision of the dial 4 and knob 5 at the front of the device where it is completely visible, and the mechanical arrangement which makes this economically practicable constitutes an important feature.

The body casting 2 is provided with an external tapered thread at 7 by which it is screwed into a flange 8 forming a part of the water heater tank.

The temperature-responsive element, shown projecting into the tank, is of the conventional rod and tube type and comprises a metal tube 9, usually copper, one end of which is screwed into the body casting at 10, and a rod 11 of Invar steel or other material having a low temperature co-efficient of expansion. The free extremity of tube 9 is internally threaded to receive a plug 12 which is, in turn, provided with a left-hand internal thread at 13 to engage the correspondingly threaded end of rod 11. Knob 5 is attached to the other extremity of rod 11 by means of a setscrew 14, and the rod is thus rotatable with the knob. Upon rotating the knob and dial, rod 11 moves longitudinally by virtue of thread 13 and, as will later appear, this manually accomplished longitudinal movement of the rod serves adjustably to vary the average temperature of the water in conformity with the householder's desires. As a part of the manufacturing procedure the device is adjusted to close the valve at some known temperature such as 140 degrees—the element being immersed in water at that temperature until the valve snaps closed. The dial is then turned, independently of rod 11, to bring the corresponding temperature marking into registration with the index and setscrew 14 is thereupon tightened.

The automatic fuel control valve is shown in Figs. 2 and 3 and identified by reference numeral 15. The valve is of the poppet type and has a stem 15a which is slidably supported in a bore 16 in the body casting. A coil spring 17 bears against the back of valve 14 tending continously to close the valve and hold it closed. A cap 18 threaded into the body casting provides access to the valve and functions as an abutment for spring 17. Valve stem 15a has an enlargement 15b forming a shoulder against which bears the forked lower end of a valve-operating lever 19 (see Fig. 7) which is fulcrumed on a pin 20. Lever 19 serves to open valve 15 under control of the snap-action mechanism which will now be described. It will be observed that the upper arm of lever 19 is much shorter than its lower arm. Hence, it will be obvious that lever 19 imparts an amplified movement to the valve, affording a substantially greater lift than could conveniently be achieved if the valve were directly actuated by the snap-action disc or annulus.

The snap-action mechanism by means of which the gradual longitudinal movements of rod 11 are converted into abrupt movements for actuation of lever 19 and, in turn, valve 15, comprises a spring sheet metal disc or annulus 21, a "spider" 22, a combined hub and fulcrum member 23, and a stationary fulcrum member 24. The combined hub and fulcrum member 23 is secured to rod 11 by means of a pin 25, and it moves with the rod. Member 23 performs two distinct functions. First, it serves as a hub on which the annulus 21 is loosely supported and centered—being formed with a shoulder 23a which bears against the normally convex face of the annulus along the edge of the axial opening. Secondly, it serves as a fulcrum member and pusher element—being formed with an integral annular protuberance 23b which is designed to function as one of the two fulcrums for the amplifying levers constituting the "spider" 22. The latter is shown to best advantage in Fig. 4. It is a sheet metal punching made, preferably, of stainless spring steel and comprises six resilient lever arms marked 22a to 22f, inclusive, all converging at the center in a web which serves as a medium for holding the levers in place. The six resilient lever arms extend radially from the axial center of the annulus 21 and rod 11 and their several outer ends bear against the normally concave face of the annulus at or near the edge thereof.

The stationary fulcrum member 24 is mounted on rod 11 and centered thereby but not secured thereto. Its bore is a running fit on the rod. Member 24 is formed with an annular protuberance 24a of a diameter across the axis somewhat greater than the corresponding diameter of the concentric protuberance 23b. Protuberance 24a functions as a second fulcrum for the lever arms 22a to 22f inclusive—the "spider" being disposed between the two annular fulcrums 23b and 24a. Figs. 2 and 6 illustrate the snap-action mechanism in its normal position or condition—that is to say, those figures illustrate the condition which obtains when no pressure or insufficient pressure is being exerted by rod 11 to snap the annulus 21—being due to the fact that the water in the tank is hot and the copper tube 9 expanded lengthwise and the rod 11 and member 23 are disposed at the right hand end of their travel as viewed in Fig. 2.

A metal plug 26 threaded into the body casting serves as a bearing for rod 11 and as a closure member. It is recessed to receive a resilient packing washer 27 and retaining washer 28. The joint is thus packed to prevent escape of gas.

Fig. 3 illustrates the structure of Fig. 2 with the fuel control valve 15 open and the snap-action mechanism in "open-valve" condition. It will be observed that annulus 21 has been snapped over dead center from its normal form, and that its abnormal or snapped-over form (Fig. 3) is substantially planar. The annulus, being designed for self-restoration, does not, in snapping over, assume a form which is the symmetrical counterpart of the normal form of Fig. 2. In snapping, the peripheral edge of the annulus moves in such manner as to rotate the lever 19 about its fulcrum 20—causing the fuel control valve abruptly to be lifted off its seat. The lift of the valve is substantially greater than the movement of the peripheral edge of annulus 21 because fulcrum 20 is so positioned that the lower arm of lever 19 is much longer than the upper arm thereof.

We have included in the structure of Figs. 1 to 7, inclusive, a snap-action element in the form of a dished frustro-conical annulus 21—which is shown in perspective in Fig. 5. That particular form of over center snap-action element is not essential to the operativeness of our device. We could substitute an annulus of curvilinear cross-section or a disc of curvilinear cross-section with or without an axial opening; but we find it advantageous to employ a frustro-conical annulus because, according to our experience, the frustro-conical annulus affords a greater peripheral movement than is obtainable with one of curvilinear cross-section and equal diameter. The frustro-conical annulus 21 is made in accordance with the teachings of Vaughn, U. S. Letters Patent No. 1,988,345. In this specification we frequently use the term "disc" conjointly or alternatively with "annulus" in reference to element 21 and other similar elements. An annulus is simply a disc with an axial opening and we use the term "disc" as embracing "annulus" within its scope. It will later be shown, with reference to Fig. 9, how a device in accordance with this invention can be made with a snap-action disc having no axial opening and, therefore, not an annulus.

The mode of operation of the above-described device is as follows: Assuming the water in the tank to have acquired the predetermined maximum temperature at which the control valve is adjusted to close, the copper tube 9 will have expanded longitudinally and rod 11, which expands but little, will have occupied the position in which it is depicted in Figs. 2 and 6. The two annular fulcrums 23b and 24a are therefore separated to a maximum extent axially and little or no pressure is exerted by lever arms 22a to 22f against the annulus 21. Hence, the annulus retains its normal form (Figs. 2 and 6) and the fuel control valve 15 is closed—the main burner flame being, in consequence, extinguished. Since there is no flame to maintain the temperature, the water will cool and as its temperatures decreases the copper tube 9 will contract and the Invar rod 11 will move to the left, as viewed in Figs. 2 and 6. The movement of the rod is, as previously stated, of a magnitude of about .002". Contraction of the copper tube gives rise to a large force which is transmitted to rod 11 and thence to member 23, which latter is moved with the rod toward the stationary fulcrum member 24. Resilient lever arms 22a to 22f, inclusive, are, consequently, rotated about the two annular fulcrums so that their free outer ends push against the annulus 21. The radial spacing of the two annular fulcrums 23b and 24a being small compared to the length of the free arm of each lever 22a to 22f, inclusive, it will be evident that the movement capable of being imparted to the free outer ends of said arms is comparatively large. The step-up leverage ratio may be of the order of about 1:9. As a matter of fact the free ends of the resilient lever arms do not actually move, at the outset, to any perceptible extent because the first result of the application of force is to flex the resilient lever arms. Force and the potential ability to move forward is thus stored up in the resilient lever arms until the pressure exerted against the annulus has reached the critical value—a magnitude sufficient to cause the annulus suddenly to snap over dead center. The snapping of the annulus occurs very abruptly and, as a result, the fuel control valve is opened abruptly and the main burner re-lighted.

When annulus 21 snaps over dead center to the abnormal form depicted in Fig. 3, resilient lever arms 22a to f, inclusive, follow through and continue to exert pressure on the annulus. The latter pressure is, of course, less than that which is necessary to snap the annulus but considerably more than what is required to prevent the annulus from restoring itself to normal. The residual force of flexure in the lever arms will continue to retain the annulus in its abnormal form until the force applied to the resilient levers 22a to f by the two fulcrum members 23 and 24 has been relieved to a predetermined extent by the expansion of copper tube 9—due to the rising temperature of the water. Closure of the control valve will, of course, follow upon the annulus 21 returning to normal form—which occurs abruptly when the maximum predetermined water temperature is again reached.

Manifestly, annulus 21 could be pushed over dead center if levers 22a to f were rigid instead of resilient, but unless there is resiliency in the levers or somewhere in the actuating system there can be no snap action of the annulus. To obtain snap action the actuating force must be applied to the disc or annulus through a yieldable medium which is capable of following through the instant the disc or annulus yields to the applied pressure. Making the "spider" 22 of spring sheet material provides the essential yieldability in a way which is extremely economical and compact. The space requirements are reduced to a minimum and likewise the cost of parts.

"Spider" 22 has an axial opening which fits rod 11 and by which it is accurately centered. Members 23 and 24 are both centered on rod 11, wherefore the two annular fulcrums 23b and 24a are perfectly concentric; and the annulus 21 also is perfectly concentric with the rod because it is mounted on a hub which is inherently concentric with the rod. This precise concentricity of all parts of the snap action mechanism is important because it makes for equality of load and movement as between the several levers 22a to 22f—without which precision it would be impossible economically to manufacture in volume devices which would operate uniformly to open and close the valve at a predetermined temperature differential.

It is desirable and most economical but not indispensable that annulus 21 be mounted on a hub which, in turn, is mounted on and carried by the Invar rod, as per Figs. 1 to 7. In Fig. 8 we have shown an alternative structure which operates in the same way as that of Figs. 1 to 7, inclusive, but in which the snap-action annulus is supported independently of the Invar rod—being mounted loosely on a sleeve 29 which is centered in and supported by the body casting. Sleeve 29 serves only as a centering support for the annulus, and a separate plunger element 30, secured to the rod, carries the movable annular fulcrum corresponding to fulcrum 23b of Fig. 6. Plunger element 30 should be a close running fit in the bore of sleeve 29 because otherwise the resultant possible eccentricity between the "spider" and the annulus may impair the accuracy of the device. Manifestly, the structure of Fig. 8 is somewhat more costly than that of Figs. 1 to 7, and it does not perform any better or differently. It is, however, a considerable improvement over the prior art from the standpoint of manufacturing economy and represents a workable and commercially practicable embodiment of our invention.

Fig. 9 depicts another embodiment of our invention in the form of a snap-action thermostatic valve wherein the snap-action element is a complete disc instead of an annulus and wherein the manual temperature regulating means does not comprise a knob and disc at the front of the device but, on the contrary, a lever situated toward the rear of the device.

In Fig. 9, 31 is the body casting; 32 is the expansible copper tube; 33 is the Invar rod; 34 is a hub member pinned to the end of the Invar rod and movable therewith; 35 is a snap-action disc, cupped at the center in two steps to conform to the shape of the hub member to provide a centering support for the disc. The disc is so formed as to provide a centering hub at 35a for a "spider" 36, similar to "spider" 22 previously described—and further formed to provide a shoulder at 35b which acts as the moving fulcrum for "spider" 36. A plug 37 screwed into the body casting includes a stationary annular fulcrum 37a for "spider" 36. When Invar rod 33 moves to the left, as viewed in Fig. 9, the "spider" levers will snap disc 35 and open the valve. A lever 38 secured to rod 33 serves the same purpose as knob 5 and dial 4 of the device of Figs. 1 to 7. Lever 38 is manually operable to rotate rod 33. Suitable graduations and indices may be provided on the body casting to inform the householder as to the average temperature for which the device is set. The provision of a lever, such as lever 38, situated toward the rear of the device, is old practice. It will be self-evident that temperature indices on the body casting to register with lever 38 would not be as easy to read as the markings on the dial 4 in the structure of Figs. 1 to 7; and that the purpose of lever 38 and its mode of operation would not be as clear to the average housewife as the purpose and mode of operation of knob 5 and dial 4. The fuel control valve and operating lever in Figs. 8 and 9 are identical to those in the structure of Figs. 1 to 7.

Fig. 10 illustrates a "spider" 40 which can be substituted for "spider" 22. Here the six resilient lever arms 40a to 40f, inclusive, are tied together by a peripheral rim 41 which serves the same purpose as the central web of "spider" 22. We prefer "spider" 22 to that of Fig. 10 because the stamping die is more simple and less fragile.

Fig. 11 illustrates another snap-action mechanism within the purview of our invention wherein the "spider" has been omitted and the essential amplification of the movements of the Invar rod is achieved by applying the force couple to the annulus in the manner of Spencer, U. S. Letters Patent No. 1,478,407. In this structure the Invar rod is identified by reference numeral 42. A shouldered hub 43 pinned to the Invar rod serves to center and support the snap-action annulus 44 and also serves as an abutment or pusher member for the annulus and as one of the annular fulcrums through which the actuating force couple is applied to the annulus. A sleeve 45 slidably mounted on rod 42 has an annular fulcrum 45a which bears against the normally concave face of annulus 44. The diameter of annular fulcrum 45a, measured across the axis, is a little larger than the outside diameter of hub 43. Due to the relatively close spacing, radially, of the points of application of force to the annulus 44, amplification of movements of the Invar rod is obtained in the snap-action annulus itself—as in the Spencer device—and, ordinarily, it is unnecessary to provide for external amplification in order to snap the annulus in response to a very small longitudinal movement of the Invar rod. In an arrangement like that of Fig. 11 it is not usually necessary to provide a special yieldable element for the purpose of effecting snap action of the disc because the Invar rod and copper tube will yield enough to take care of the very small "follow through" movement which must be given to hub 43 when the annulus starts its movement over dead center. We have, however, provided a yieldable element in the shape of a coil spring 46 which will function to take care of the "follow through" movement, but which, primarily, is not provided for that purpose. The main function of the heavy spring 46 is to protect the snap-action annulus and other parts of the device from the violent force which otherwise would be built up if the device were subjected to very low sub-zero temperatures. When such a condition occurs spring 46 yields and thereby diminishes the force applied to annulus 44. The snap-action mechanism of Fig. 11 can be substituted for the snap-action mechanism of Figs. 1 to 7.

When knob 5 of the device of Figs. 1 to 7 or that of Fig. 8 is rotated clockwise, as viewed in Fig. 1, the left-hand thread at 13 causes rod 11 to advance to the left, as viewed in Figs. 2, 3, 6 and 8. This movement of the Invar rod results in snapping the annulus to the abnormal configuration of Fig. 3 and opening the fuel control valve—if the valve does not happen already to be open when the adjustment is undertaken. After the temperature-increasing adjustment has been made it is necessary for the copper tube 9 to expand to a correspondingly increased extent in order to permit annulus 21 to snap back to its normal configuration; and, manifestly, a higher water temperature must be attained to effect the increased expansion of the copper tube. Conversely, a counterclockwise rotation of knob 5, as viewed in Fig. 1 causes the Invar rod to move to the right, as viewed in Figs. 2, 3, 6 and 8 and, as a consequence, a smaller expansion of the copper tube will cause the valve to close. This means that the maximum water temperature is decreased. In the device of Fig. 9 water temperature regulation is accomplished in the same way except that the Invar rod is rotated by lever 38 instead of a knob.

It is possible to make a frustro-conical annulus similar in appearance to that illustrated in Fig. 5 which will snap from one side to the other of dead center in either direction and which will not be self-restoring. That kind of an annulus, while capable of utilization, is not suitable for the present purpose. What is required here is an annulus which can be snapped from the normal form of Fig. 2 to the abnormal form of Fig. 3 and which will restore itself to the normal form when the pressure is released or reduced to a suitable extent. Whether or not a particular annulus will be self-restoring depends upon its dimensions and form and upon the material out of which it is made. We cannot furnish any formula whereby to determine the design and proportions which will produce a self-restoring and satisfactorily operative annulus under different fixed conditions; but in order to complete our disclosure we will specify the dimensions of the annulus of Figs. 1 to 7, which is being successfully employed in a temperature regulator of the design shown. The annulus is made of .011 inch stainless spring steel sheet. Its outside diameter is $\tfrac{7}{8}$ inch. The central aperture is circular and of ½ inch diameter; and the offset, when the annulus is in its normal form is between .040 inch and .050 inch.

We claim:

1. In a temperature-regulating device, thermosensitive means, a rod connected with said thermosensitive means and movable axially by said means in response to temperature changes, a hub member secured to said rod, a normally dished snap-action annulus mounted on said hub member, said annulus having an axial opening by which it is centered on said hub member, said hub member having a shoulder which bears against one face of said annulus adjacently to said axial opening, yieldable means bearing against the opposite face of said annulus and capable of exerting sufficient distorting pressure on said annulus to cause said annulus to snap from its normal form to its abnormal form, said annulus being capable of restoring itself to its normal form when the distorting pressure is removed, and a valve operatively connected with the peripheral portion of said annulus.

2. A temperature-regulating device in accordance with claim 1 wherein said annulus is of frustro-conical form.

3. In a temperature-regulating device, thermosensitive means, a rod connected with said thermosensitive means and movable axially by said means in response to temperature changes, a hub member secured to said rod, a normally dished snap-action annulus mounted on said hub member, said annulus having an axial opening by which it is centered on said hub member, said hub member having a shoulder which bears against one face of said annulus adjacently to said axial opening, yieldable means bearing against the opposite face of said annulus and capable of exerting sufficient distorting pressure on said annulus to cause said annulus to snap from its normal form to its abnormal form, said annulus being capable of restoring itself to its normal form when the distorting pressure is removed, a valve, and a lever interconnecting said valve with the peripheral portion of said annulus.

4. A temperature-regulating device in accordance with claim 3, characterized in that said lever has a relatively short lever arm which engages the peripheral portion of the annulus, and a long lever arm which is operatively connected with the valve, the arrangement being such that an amplification of the movement of the periphery of the annulus is effected by said lever and transmitted thereby to said valve, thereby accomplishing a comparative increase in the extent of opening of said valve.

5. In a temperature-regulating device, a body casting having a fuel-passageway therethrough and a valve interposed in said passageway for interrupting the flow of fuel therethrough, said valve including a closure member and a valve seat, a spring for closing said valve, a thermosensitive element comprising a thermally expansible tube one end of which is connected to said body casting, a rod co-axial with said tube and having one end connected with the free end of said tube through the medium of a thread, said rod extending through said body casting, said body casting having an interior chamber through which said rod extends, a hub member secured to said rod within said chamber and movable axially therewith, a normally dished snap-action annulus having a relatively large central opening by which it is centered on said hub member, said hub member having a shoulder which bears against one face of said annulus adjacently to said central opening, yieldable means bearing against the opposite face of said annulus and capable of exerting sufficient distorting pressure on said annulus to cause said annulus to snap from its normal form to its abnormal form, thereby effecting an abrupt movement of the peripheral edge of said annulus axially of said rod, and a lever system for transmitting the abrupt movement, at least in one direction, of said peripheral edge to said valve for opening said valve, said lever system comprising a short lever arm, the free end of which engages said annulus near the periphery thereof, and a long lever arm, the free end of which is operatively connected with said valve.

6. The combination with a thermosensitive element of a rod operatively associated with said element and movable axially thereby in response to temperature changes, a hub member mounted on said rod and secured thereto, a frustro-conical annulus of spring sheet material having a comparatively large central opening by which it is centered on said hub member, said hub member having a shoulder which engages one face of said annulus along the edge of said central opening, a spider mounted on said rod and having a plurality of resilient radially extending arms which engage the opposite face of said annulus near the periphery thereof, said hub member having an annular fulcrum which engages one face of said "spider," and a sleeve mounted on said rod but not secured thereto, said sleeve having an annular fulcrum bearing against the opposite face of said "spider," said last-mentioned annular fulcrum bearing against said "spider" along a circumference of greater diameter than that of said first-mentioned annular fulcrum.

7. The combination with a thermosensitive element, of a rod operatively associated with said element and movable axially thereby in response to temperature changes, a hub member mounted on said rod and secured thereto, a frustro-conical annulus of spring sheet material having a comparatively large central opening by which it is centered on said hub member, said member having a shoulder which engages one face of said annulus along the edge of said central opening, a sleeve mounted on said rod but not secured thereto, said sleeve bearing against that face of said annulus which is opposite said shoulder and along a line of greater circumference than that of said shoulder, and a spring pressing said sleeve against said annulus.

8. In a temperature-regulating device, thermosensitive means, a rod connected with said thermosensitive means and movable axially by said means in response to temperature changes, a hub member secured to said rod, a normally dished snap-action annulus mounted on said hub member, said annulus having an axial opening by which it is centered on said hub member, said hub member having a shoulder which bears against one face of said annulus adjacently to said axial opening, yieldable means bearing against the opposite face of said annulus and capable of exerting sufficient distorting pressure on said annulus to cause said annulus to snap from its normal form to its abnormal form, said annulus being capable of restoring itself to its normal form when the distorting pressure is removed, an element-to-be-actuated, and a lever interconnecting said element-to-be-actuated with the peripheral portion of said annulus.

9. The combination with a thermosensitive element, of a rod operatively associated with said element and movable axially thereby in response to temperature changes, a dished snap-action over center device of spring material having a central opening through which said rod extends, said over center device being carried by said rod, means defining a shoulder secured to said rod and movable therewith, said shoulder bearing against one face of said over center device adjacent the peripheral edge of said opening, a plurality of radially extending resilient lever arms disposed concentrically about said rod and having their outer ends bearing against the opposite face of said over center device near the outer periphery thereof, and fulcrum structure bearing against each of said lever arms at points intermediate the ends thereof for exerting pressure through said lever arms against said over center device in opposition to said shoulder, said lever arms being sufficiently stiff to be capable, conjointly, of transmitting force enough against said over center device to cause said device to snap from its normal form to its abnormal form, but sufficiently resilient to prevent, under ordinary conditions, such excessive force being applied to said device as would cause permanent deformation thereof.

10. The combination with a thermosensitive element, of a rod operatively associated with said element and movable axially thereby in response to temperature changes, a dished snap-action over center device of spring material the center portion of which is so disposed as to be forcibly acted upon by said rod for effecting an over center snap-action movement of said device in response to lengthwise movement of said rod in one direction, said device being capable of self-restoration when the force applied thereto by said rod is relieved, abutment means operative upon said device in co-operation with said rod for applying, indirectly, a reactive force to said device in opposition to that applied by said rod, and a plurality of resilient lever arms disposed concentrically about and extending radially from the axial center of said device, said levers being interposed between said abutment means and one face of said over center device, the outer end of each of said arms bearing against said face near the outer peripheral edge of said device, said lever arms, conjointly, being operative as a yieldable coupling between said abutment means and said device and capable of transmitting enough force to said device to cause said device to snap from its normal to its abnormal form, said arms being yieldable enough to prevent, under ordinary conditions, the application of enough force to said device to cause permanent deformation thereof.

11. A thermostatic snap-action mechanism comprising, in combination, a self-restoring snap-action over center disc of spring material having a free peripheral edge, said disc being supported axially, a rod extending axially of said disc and concentric therewith, said rod being movable lengthwise thermostatically, a plurality of movement-amplifying levers situated adjacent said disc and bearing against the normally concave face of said disc near the peripheral edge thereof, said levers being operatively associated with said rod and so fulcrumed as to amplify the lengthwise movements of said rod and transmit said movements in amplified form to said disc for snapping said disc.

12. A thermostatic snap-action mechanism comprising, in combination, a self-restoring snap-action over center disc of spring material having a free peripheral edge, said disc being supported axially, a rod extending axially of said disc and concentric therewith, said rod being movable lengthwise thermostatically, a plurality of resilient movement-amplifying levers situated adjacent the normally concave face of said disc, said levers being disposed about the axial center of said disc and extending radially therefrom, the outer ends of said levers bearing against the normally concave face of said disc near the peripheral edge thereof, said levers being operatively associated with said rod and so fulcrumed as to amplify the lengthwise movements of said rod and transmit said movements in amplified form to said disc for snapping said disc.

13. A thermostatic snap-action mechanism comprising, in combination, a self-restoring snap-action over center disc of spring material having a free peripheral edge, said disc being supported axially, abutment means bearing against the normally convex face of said disc at the center portion thereof, a "spider" situated adjacent the normally concave face of said disc and comprising a plurality of resilient movement-amplifying levers, said levers being disposed about the axial center of said disc and extending radially therefrom, the outer ends of said levers bearing against the normally concave face of said disc near the peripheral edge thereof, said levers being fulcrumed intermediate their ends and thermostatic means for actuating said levers to snap said disc.

14. A thermostatic snap-action mechanism comprising, in combination, a self-restoring snap-action over center annulus of spring material having a free peripheral edge, a hub for centering and supporting said annulus axially, a rod extending axially through said hub and annulus, a member attached to said rod and having an annulus fulcrum co-axial with said rod, structure including a second annular fulcrum, and a "spider" interposed between said fulcrums and disposed adjacent the normally concave face of said disc, said "spider" comprising a plurality of resilient sheet metal levers disposed around the axial center of said annulus and extending radially from said axial center, the outer ends of said levers bearing against the normally concave face of said annulus near the peripheral edge thereof.

15. A thermostatic snap-action mechanism comprising, in combination, a self-restoring snap-action over center annulus of spring material having a free peripheral edge, a hub for centering and supporting said annulus axially, a rod extending axially through said hub and annulus, a plunger carried by said rod and slidably guided by said hub, said plunger having an annular fulcrum co-axial with said rod, structure including a second annular fulcrum, said fulcrums being spaced radially, and a "spider" interposed between said annular fulcrums and operative to be actuated thereby in response to longitudinal movements of said rod, said "spider" comprising a plurality of resilient sheet metal levers disposed around the axial center of said annulus and extending radially from said axial center, the outer ends of said levers bearing against the normally concave face of said annulus near the peripheral edge thereof.

SIDNEY P. VAUGHN.
WAYNE E. JENKINS.